(12) United States Patent
Shchur et al.

(10) Patent No.: US 11,069,139 B2
(45) Date of Patent: Jul. 20, 2021

(54) DEVICE AND METHOD FOR VIRTUAL REALITY, AUGMENTED REALITY, AND MIXED REALITY

(71) Applicant: Samsung Electronics Co., Ltd., Suwon-si (KR)

(72) Inventors: Oleksandr Shchur, Kyiv (GB); Oleksandr Radomskyi, Kharkiv (GB); Yevgen Yakishyn, Kyiv (GB); Gennadiy Kis, Kyiv (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 90 days.

(21) Appl. No.: 16/253,966

(22) Filed: Jan. 22, 2019

(65) Prior Publication Data

US 2019/0325656 A1 Oct. 24, 2019

(30) Foreign Application Priority Data

Apr. 18, 2018 (KR) .......................... 10-2018-0045105

(51) Int. Cl.
*G02B 27/14* (2006.01)
*G06T 19/00* (2011.01)
*G02B 27/01* (2006.01)

(52) U.S. Cl.
CPC ........ *G06T 19/006* (2013.01); *G02B 27/0101* (2013.01); *G02B 27/0149* (2013.01); *G02B 2027/014* (2013.01); *G02B 2027/0132* (2013.01); *G02B 2027/0138* (2013.01); *G02B 2027/0154* (2013.01)

(58) Field of Classification Search
CPC .. H04N 5/7491; G02B 27/01; G02B 27/0101; G02B 27/0149; G02B 27/017; G02B 27/0172; G02B 27/0176; G02B 27/0179; G02B 2027/0138; G02B 2027/014; G06T 19/006

See application file for complete search history.

(56) References Cited

U.S. PATENT DOCUMENTS 9,366,871 B2 6/2016 Ghosh et al.
2018/0011327 A1* 1/2018 Perlin ................ G02B 27/0176

OTHER PUBLICATIONS

Kickstarter; "ARYZON—3D Augmented Reality for Your Smartphone"; 2017; https://www.kickstarter.com/projects/aryzon/aryzon-3d-augmented-reality-for-every-smartphone/faqs.
Vrroom; "13 Companies Buliding AR Glasses"; Jan. 1, 2017; https://www.virroom.buzz/vr-news/business/13-companies-building-ar-glasses.
Jasmin Rubinovitz; "DIY AR Device, Augmented Reality for Everyone"; Apr. 2016; HTTP://WWW.jasrub.com/projects/ar-device/.

* cited by examiner

*Primary Examiner* — Alicia M Harrington
(74) *Attorney, Agent, or Firm* — Jefferson IP Law, LLP

(57) ABSTRACT

A method of operating an optical device is provided. The method includes selecting at least one of a first mode for recognizing virtual reality (VR) content, a second mode for recognizing augmented reality (AR) content, and a third mode for recognizing mixed reality (MR) content, and based on a result of the selecting, performing at least one of the first mode by controlling a display to allow a user to recognize the VR content via a lens, the second mode by controlling the display to allow the user to recognize the AR content via the lens and a first mirror, and the third mode for controlling the display and a camera to allow the user to recognize the MR content via the lens, the first mirror, and a second mirror.

16 Claims, 9 Drawing Sheets

AR/MR MODE OPERATION

AR/MR CONFIGURATION

OPTICAL CONFIGURATION FOR USER

CARDBOARD DEVICE

DEVICE AND METHOD FOR VIRTUAL REALITY, AUGMENTED REALITY, AND MIXED REALITY

CROSS-REFERENCE TO RELATED APPLICATION(S)

This application is based on and claims priority under 35 U.S.C. § 119(a) of a Korean patent application number 10-2018-0045105, filed on Apr. 18, 2018, in the Korean Intellectual Property Office, the disclosure of which is incorporated by reference herein in its entirety.

BACKGROUND

1. Field

The disclosure relates to devices for virtual reality, augmented reality, and mixed reality and methods of operating the devices.

2. Description of Related Art

Recently, electronic devices and display devices capable of realizing virtual reality (VR) have been developed. Thus, interest in such devices has constantly increased. Technologies for realizing augmented reality (AR) and mixed reality (MR) have been studied as the next stage of VR.

Unlike VR which operates based on a full virtual world, AR is a display technology of further increasing the effect of reality by overlapping or combining and showing virtual objects or information in an environment of the real world. VR is limitedly applied to fields such as game or virtual experience, whereas AR has the advantage of being applied to various real environments. In particular, AR is attracting attention as the next generation display technology suitable for a ubiquitous environment or an Internet of Things (IoT) environment.

Taking one step further, mixed reality (MR) is a technology of generating a space that combines real world information with virtual world information and fuses the two worlds. MR is a technology based on the merits of AR and VR. MR is a combination of real world with virtual information. MR is an improvement of AR and has both advantages of VR and AR. A device for realizing MR is basically similar to a device for realizing AR. An integration of the device for realizing MR and the device for realizing AR will be described below.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide configurations of a device for implementing virtual reality (VR), augmented reality (AR), and mixed reality (MR).

In accordance with an aspect of the disclosure, configurations of a device for implementing all VR, AR, and MR at low cost is provided.

Additional aspects will be set forth in part in the description which follows and, in part, will be apparent from the description, or may be learned by practice of the presented embodiments.

In accordance with an aspect of the disclosure, an optical device is provided. The optical device includes a terminal including a camera, a display, at least one memory configured to store program instructions, and at least one processor, a container comprising a lens configured to receive a signal transmitted from the display, a first mirror coupled to a first side of the container at a first predetermined angle, and a second mirror coupled to a second side of the container at a second predetermined angle. The program instructions, when executed by the at least one processor, cause the at least one processor to perform a first mode operation of controlling the display to allow a user to recognize VR content via the lens, perform a second mode operation of controlling the display to allow the user to recognize AR content via the lens and the first mirror, and perform a third mode operation of controlling the display and the camera to allow the user to recognize MR content via the lens, the first mirror, and the second mirror.

The first mode may be a mode in which a signal with respect to the VR content output from the display is input to user's eyes by having the signal transmitted through the lens.

The second mode may be a mode in which a signal with respect to the AR content output from the display and a signal with respect to an object viewed by the user through the first mirror are overlapped and input to user's eyes.

The signal with respect to the AR content may be input to the user's eyes via the lens.

The third mode may be a mode in which a signal with respect to an object viewed by the user through the first mirror and a signal with respect to the MR content output from the display based on a signal with respect to the object recognized by the camera through the second mirror are overlapped and input to the user's eyes.

The signal with respect to the MR content may be input to the user's eyes via through the lens.

The processor may be configured to compare the signal with respect to the object recognized by the camera with the signal with respect to the object viewed by the user through the first mirror and calibrate a distortion state of the signal with respect to the object recognized by the camera.

The container may further include a switcher configured to switch to at least one of a first mode, a second mode, and a third mode.

In accordance with another aspect of the disclosure, a method of operating an optical device is provided. The method includes selecting at least one of a first mode for recognizing virtual reality (VR) content, a second mode for recognizing augmented reality (AR) content, and a third mode for recognizing mixed reality (MR) content, and based on a result of the selecting, performing at least one of the first mode by controlling a display to allow a user to recognize the VR content via a lens, the second mode by controlling the display to allow the user to recognize the AR content via the lens and a first mirror, and the third mode by controlling the display and a camera to allow the user to recognize the MR content via the lens, the first mirror, and a second mirror.

The first mode may be a mode in which a signal with respect to the VR content output from the display is input to user's eyes via the lens.

The second mode may be a mode in which a signal with respect to the AR content output from the display and a signal with respect to an object viewed by the user through the first mirror are overlapped and input to user's eyes.

The first mirror may be coupled to a first side of a container at a predetermined angle.

The signal with respect to the AR content may be input to the user's eyes via the lens.

The third mode may be a mode in which a signal with respect to an object viewed by the user through the first mirror and a signal with respect to the MR content output from the display based on a signal with respect to the object recognized by the camera through the second mirror are overlapped and input to the user's eyes.

The second mirror may be coupled to a second side of a container at a predetermined angle.

The signal with respect to the MR content may be input to the user's eyes via the lens.

The third mode may be a mode in which the signal with respect to the object recognized by the camera and the signal with respect to the object viewed by the user through the first mirror are compared to calibrate a distortion state of the signal with respect to the object recognized by the camera.

In accordance with another aspect of the disclosure, a computer program is provided. The computer program product includes a non-transitory computer readable recording medium including a program to perform operations of selecting at least one of a first mode for recognizing virtual reality (VR) content, a second mode for recognizing augmented reality (AR) content, and a third mode for recognizing mixed reality (MR) content, and based on a result of the selecting, performing at least one of the first mode by controlling a display to allow a user to recognize the VR content via a lens, the second mode by controlling the display to allow the user to recognize the AR content via the lens and a first mirror, and the third mode by controlling the display and a camera to allow the user to recognize the MR content via the lens, the first mirror, and a second mirror.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
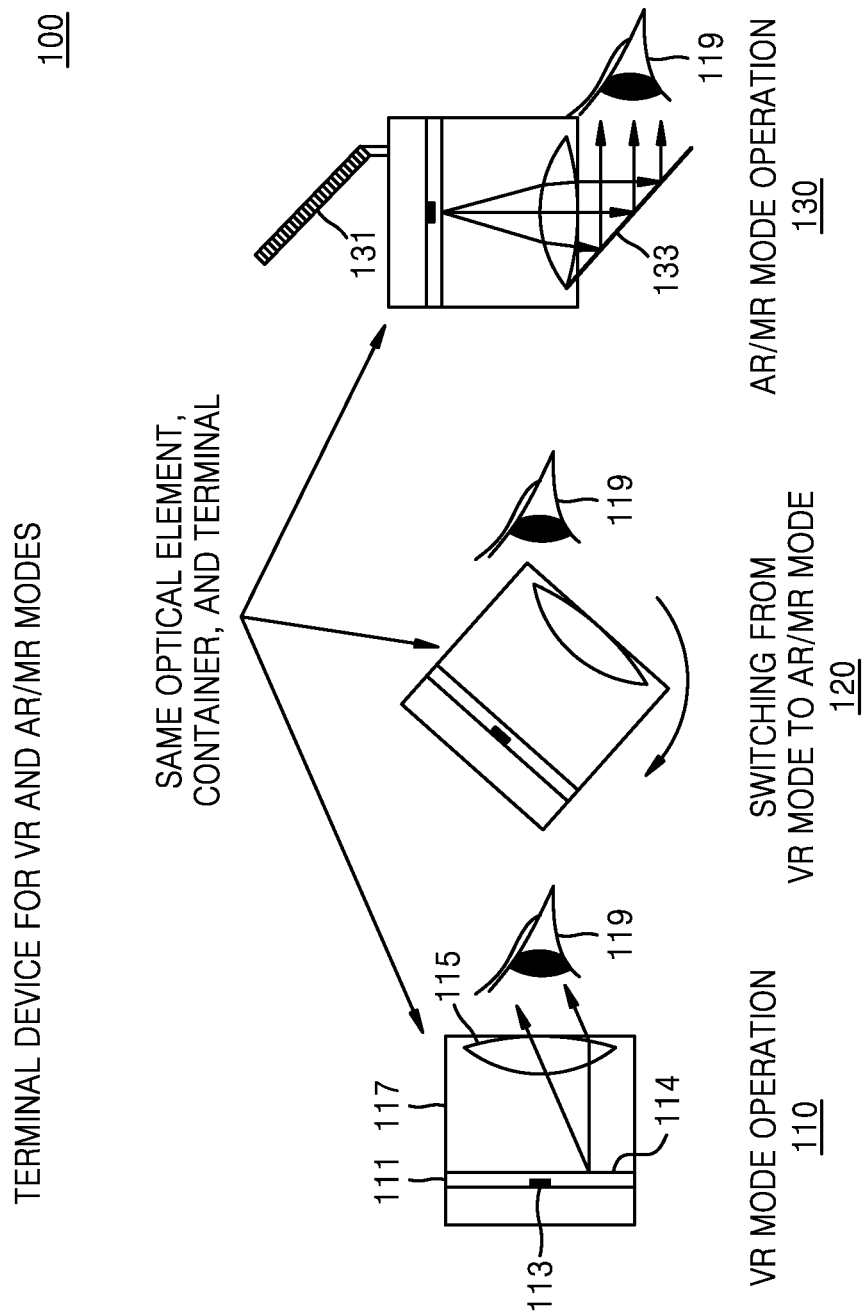
FIG. 1 shows a configuration of a system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms used in the disclosure are common terms that are currently widely used in consideration of their function in the disclosure. However, the terms may be different according to an intention of one of ordinary skill in the art, a precedent, or the advent of new technology. Therefore, the terms which are used in the following embodiments should be construed as having meanings and concepts matching the technical spirit of the disclosure in order to describe the disclosure when the terms are specifically defined in the specification, and should be construed as being confined to common meanings understood by one of ordinary skill in the art when the terms are not specifically defined in the specification.

It will be understood that, although the terms first, second, etc. may be used herein to describe various elements, these elements should not be limited by these terms. These terms are only used to distinguish one element from another.

The terminology used herein is for the purpose of describing various embodiments only and is not intended to be limiting of various embodiments. As used herein, the singular forms "a," "an," and "the," are intended to include the plural forms as well, unless the context clearly indicates otherwise. Throughout the specification, it will be understood that when an element is referred to as being "connected" to another element, it may be "directly connected" to the other element or "electrically connected" to the other element with intervening elements therebetween. It will be further understood that when a part "includes" or "comprises" an element, unless otherwise defined, the part may further include other elements, not excluding the other elements.

The use of the terms "a" and "an" and "the" and similar referents in the context of describing the disclosure are to be construed to cover both the singular and the plural. Also, the steps of all methods described herein may be performed in any suitable order unless otherwise indicated herein or otherwise clearly contradicted by context. The disclosure is not limited to the described order of the steps.

In the disclosure, the expression 'some embodiments' or 'an embodiment' do not always indicate the same embodiment.

The disclosure may be described in terms of functional block components and various processing steps. Such functional blocks may be realized by any number of hardware and/or software components configured to perform the specified functions. For example, the functional blocks of the disclosure may be implemented by one or more microprocessors or circuit components for a predetermined function. Also, for example, the functional blocks of the disclosure may be implemented with any programming or scripting language. Functional aspects may be implemented in algorithms that are executed on one or more processors. Furthermore, the disclosure could employ any number of conventional techniques for electronics configuration, signal processing and/or control, data processing and the like. The words "mechanism", "element", "means", and "configuration" are used broadly and are not limited to mechanical or physical embodiments, but may include software routines in conjunction with processors, etc.

Furthermore, the connecting lines, or connectors shown in the various figures presented are intended to represent various functional relationships and/or physical or logical couplings between the various elements. It should be noted that many alternative or additional functional relationships, physical connections or logical connections may be present in a practical device.

Hereinafter, the disclosure will be described in detail by explaining preferred embodiments of the disclosure with reference to the attached drawings.

FIG. 1 shows a configuration of an optical system according to an embodiment of the disclosure.

Referring to FIG. 1, an optical device 100 with respect to a virtual reality (VR) mode 110 and at least one mode 130 of an augmented reality (AR) mode and a mixed reality (MR) mode.

According to an embodiment, the at least one mode 130 may be implemented by the optical device 100. The optical device 100 may be a single device.

According to an embodiment, the optical device 100 may include an optical element, a container, and a terminal (e.g., a smartphone).

Specifically, the optical device 100 according to an embodiment may include first configuration units (i.e., terminal 111, lens 115, and container 117) for implementing the VR mode 110 (hereinafter referred to as a first mode) for displaying VR content and second configuration units (i.e., terminal 111, lens 115, container 117, mirror 131, and translucent mirror 133) for implementing the at least one mode 130 of the AR mode (hereinafter referred to as a second mode) for displaying AR content and the MR mode (hereinafter referred to as a third mode) for displaying MR content, respectively.

According to an embodiment, a user of the optical device 100 may perform an operation 120 of switching to one of the first mode, the second mode, and the third mode through a container 117.

The first configuration units and the second configuration units may share a terminal 111. The first configuration units and the second configuration units may share a lens 115 receiving an image signal output from the terminal 111. The first configuration units and the second configuration units may share the container 117. It should be understood, however, that the devices included in the respective configuration units do not necessarily include the above-described devices, but include devices suitable for defining characteristics of the respective configuration units. Although the first configuration units and the second configuration units share the container 117, this is merely an example. First configuration units and second configuration units may not include the container 117 according to the definition of the respective configuration units.

To implement the VR mode 110, the first configuration units (i.e., the terminal 111, the lens 115, and the container 117) may correspond to one another.

The first configuration units may include the terminal 111, the lens 115, and the container 117.

The terminal 111 may include a processor (not shown), a memory (not shown), a camera 113, and a display 114.

The terminal 111 may be a mobile device including a mobile phone and a tablet PC, or a computing device including a CPU. The terminal 111 may be a standalone device independent from the container 117.

The terminal 111 may include at least one memory storing program instructions. The program instructions may be instructions for executing content regarding at least one of the VR mode, the AR mode, and the MR mode.

The at least one processor may be a device capable of controlling operations of the terminal 111 and configurations included in the terminal 111. The at least one processor may control the display 114 of the terminal 111. The display 114 may include at least one light emitting device.

The at least one processor may control the at least one light emitting device. The at least one processor may control the display 114 in the VR mode 110 to output a signal regarding the VR content.

The lens 115 may refract the signal and output the signal to a user's eye 119. Thus, the user's eye 119 may receive the signal and recognize the VR content.

That is, the user may recognize the VR content through the first configuration units according to the first mode.

To implement the at least one mode 130 of the second mode and the third mode, the second configuration units may correspond.

The second configuration units may include the terminal 111, the lens 115, the container 117, the mirror 131, and the translucent mirror 133.

The terminal 111 may include at least one processor (not shown), the camera 113 and the display 114.

The at least one processor may control the camera 113 and the display 114 of the terminal 111. The at least one processor may control the display 114 of the terminal 111. The display 114 may include at least one light emitting device.

The at least one processor may control the at least one light emitting device. The at least one processor may control the display 114 to output a signal regarding the AR content in the second mode and control the display 114 to display a signal regarding the MR content in the third mode.

The mirror 131 may reflect a real signal of a real object and output the reflected signal to the camera 113. The mirror 131 may be coupled to one side of the container 117 at a predetermined angle.

The lens 115 may output at least one of the signal regarding the AR content and the signal regarding the MR content to the translucent mirror 133 by having the signal transmitted therethrough.

The translucent mirror 133 may output a real signal regarding a real object and output the real signal to the user's eye 119 by having the real signal transmitted therethrough. The translucent mirror 133 may reflect at least one of the signal regarding the AR content and the signal regarding the MR content and output the reflected signal to the user's eye 119. Thus, the user's eye 119 may recognize the AR content and/or the MR content. The translucent mirror 133 may be coupled to one side of the container 117 at a predetermined angle.

That is, the user may recognize the AR content and/or the MR content through the second configuration units according to at least one of the second mode and the third mode.

The container 117 may include a support (not shown) for supporting the first configuration units and the second configuration units and a switcher (not shown) for switching to at least one of the first mode, the second mode and the third mode.

The supporter may be a concept including all physical devices of the container 117 for supporting the first configuration units and the second configuration units and a combination of the physical devices.

The switcher may include all physical devices of the container 117 for the user to switch to at least one of the first mode, the second mode and the third mode and a combination of the physical devices.

The supporter and the switcher may be realized as an integral physical device.

According to an embodiment, the user may perform the operation 120 of switching to one of the first mode, the second mode and the third mode through the container 117.

Since the first configuration units with respect to the VR mode 110 and the second configuration units with respect to the at least one mode 130 of the second mode and the third mode share the terminal 111 and the lens 115, even though the first mode and the second mode are implemented by the optical device 100, the required device configuration may be minimized. Thereby, the optical device 100 according to an embodiment may realize all VR, AR, and MR at low cost.

Figure 2:
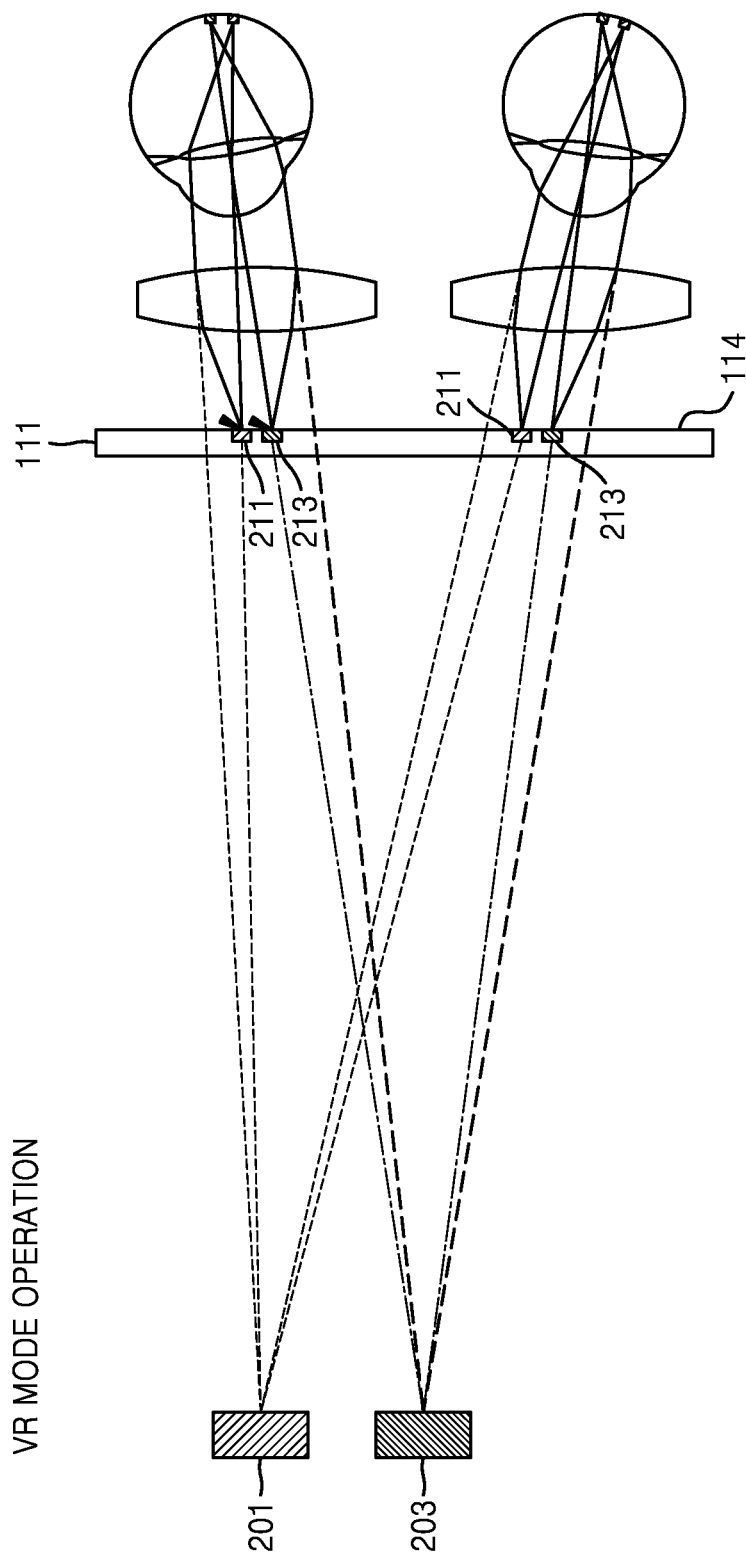
FIG. 2 illustrates a process for a user to recognize VR content according to an embodiment of the disclosure.
Figure 3:
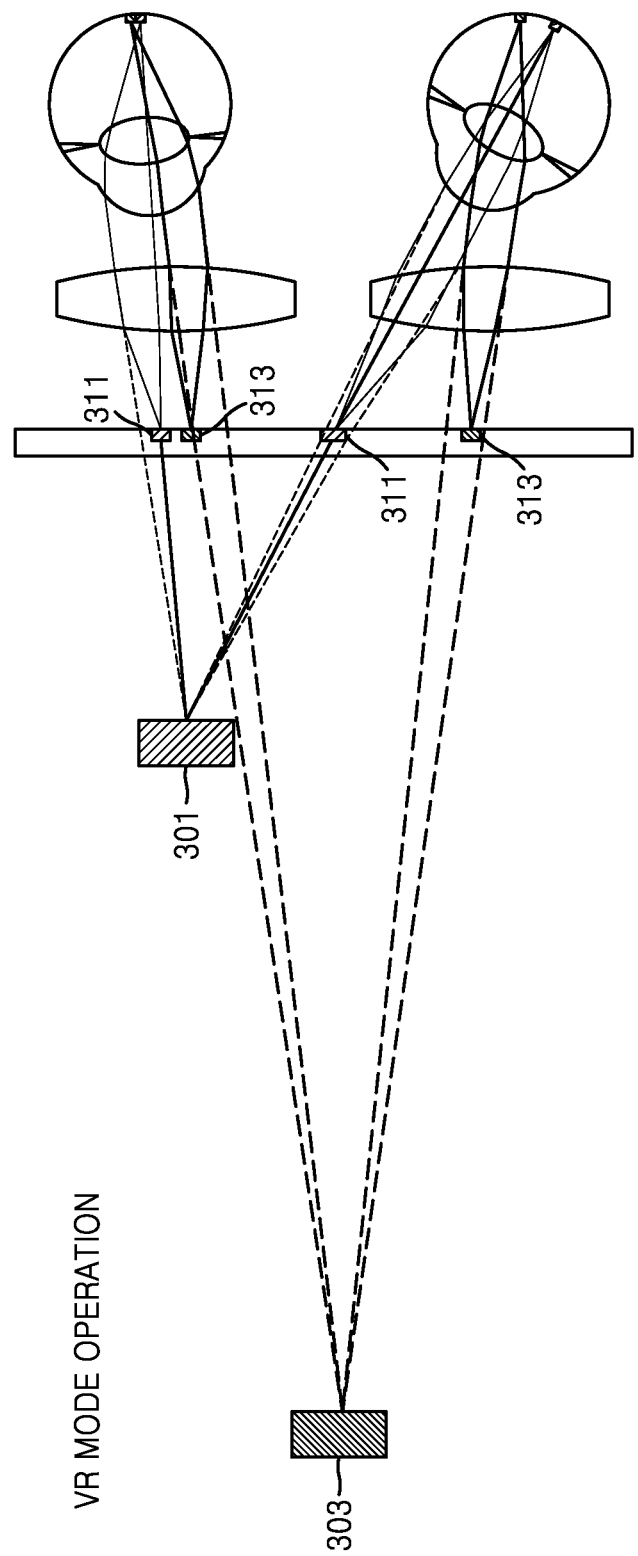
FIG. 3 illustrates a process for a user to recognize VR content according to an embodiment of the disclosure.
Figure 4:
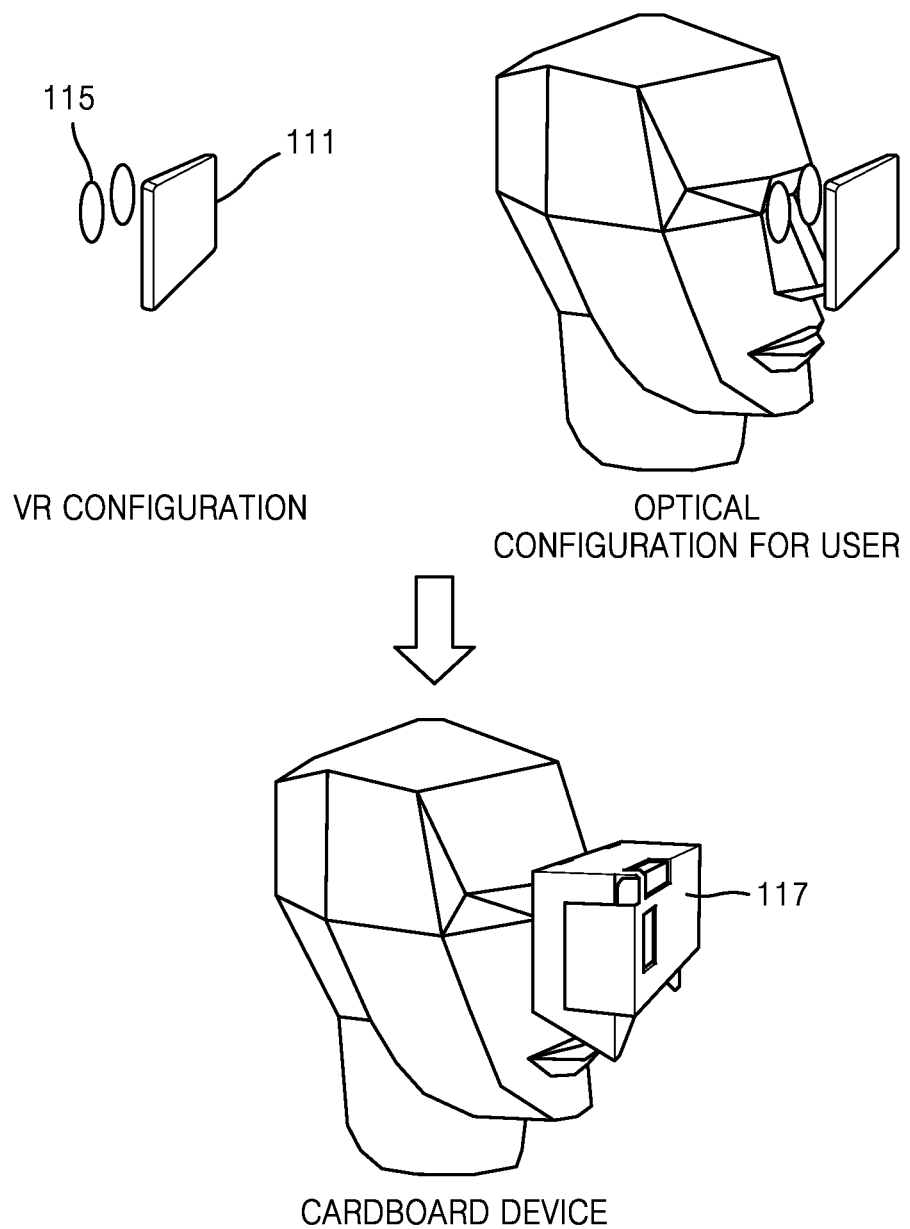
FIG. 4 illustrates a user wearing an optical device according to an embodiment of the disclosure.

FIGS. 2, 3, and 4 are diagrams for explaining an operation in a VR mode (a first mode) according to various embodiments of the disclosure.

Referring to FIG. 2, a process for a user to recognize VR content according to an embodiment of the disclosure.

The embodiment of the first mode described with reference to FIG. 2 assumes VR objects 201 and 203 that the user recognizes are far from the VR content.

At least one processor may control the display 114 of the terminal 111. The display 114 may include light emitting devices 211 and 213. The at least one processor may control the light emitting devices 211 and 213.

The at least one processor may control the display 114 of the terminal 111 to operate the light emitting devices 211 and 213 that allow the user to recognize that the VR objects 201 and 203 are far away.

For example, the at least one processor may control the display 114 of the terminal 111 to operate the light emitting device 211 that allows the user to recognize that the VR object 201 is far away and to operate the light emitting device 213 that allows the user to recognize that the VR object 203 is far away.

FIG. 3 illustrates a process for a user to recognize VR content as an embodiment of the disclosure.

The embodiment of the first mode described with reference to FIG. 3 assumes a VR object 301 that the user recognizes is nearby in the VR content and a VR object 303 that the user recognizes is far away.

Referring to FIG. 3, the at least one processor may control the display 114 of the terminal 111. The display 114 may include light emitting devices 311 and 313. The at least one processor may control the light emitting devices 311 and 313.

The at least one processor may control the display 114 of the terminal 111 to operate the light emitting devices 311 and 313 to allow the user to recognize that the VR object 301 is far away.

FIG. 4 illustrates a user wearing an optical device according to an embodiment of the disclosure.

Referring to FIG. 4, the first configuration units may include the terminal 111, the lens 115, and the container 117.

In an embodiment, the terminal 111 may be a mobile smart device.

The terminal 111 may include at least one processor (not shown), the camera 113 and the display 114.

The at least one processor may control the display 114 of the terminal 111. The display 114 may include at least one light emitting device. The at least one processor may control the at least one light emitting device.

The at least one processor may control the display 114 in the VR mode 110 to output a signal regarding the VR content.

The lens 115 may refract the signal regarding the VR content and output the signal to the user's eye 119. The signal regarding the VR content may pass through the lens 115 and input to the user's eye 119.

The container 117 may include a supporter for supporting the first configuration units, and a switch for switching to one of the first mode, the second mode, and the third mode.

The supporter may be a concept including all physical devices for supporting the first configuration units and a combination of the physical devices.

The switcher may be a concept including all physical devices for the user to switch to one of the first mode, the second mode and the third mode and a combination of the physical devices.

The supporter and the switcher may be realized by an integral physical device.

In an embodiment, the container 117 may be formed as a corrugated cardboard. However, it is only one embodiment that the container 117 may be formed as the corrugated cardboard and may be actually formed using various materials such as metal and plastic.

The container 117 may physically support the first configuration units to fix the first configuration units to a predetermined position. The user may switch the first mode to at least one of the second mode and the third mode through the switcher included in the container 117.

Figure 5:
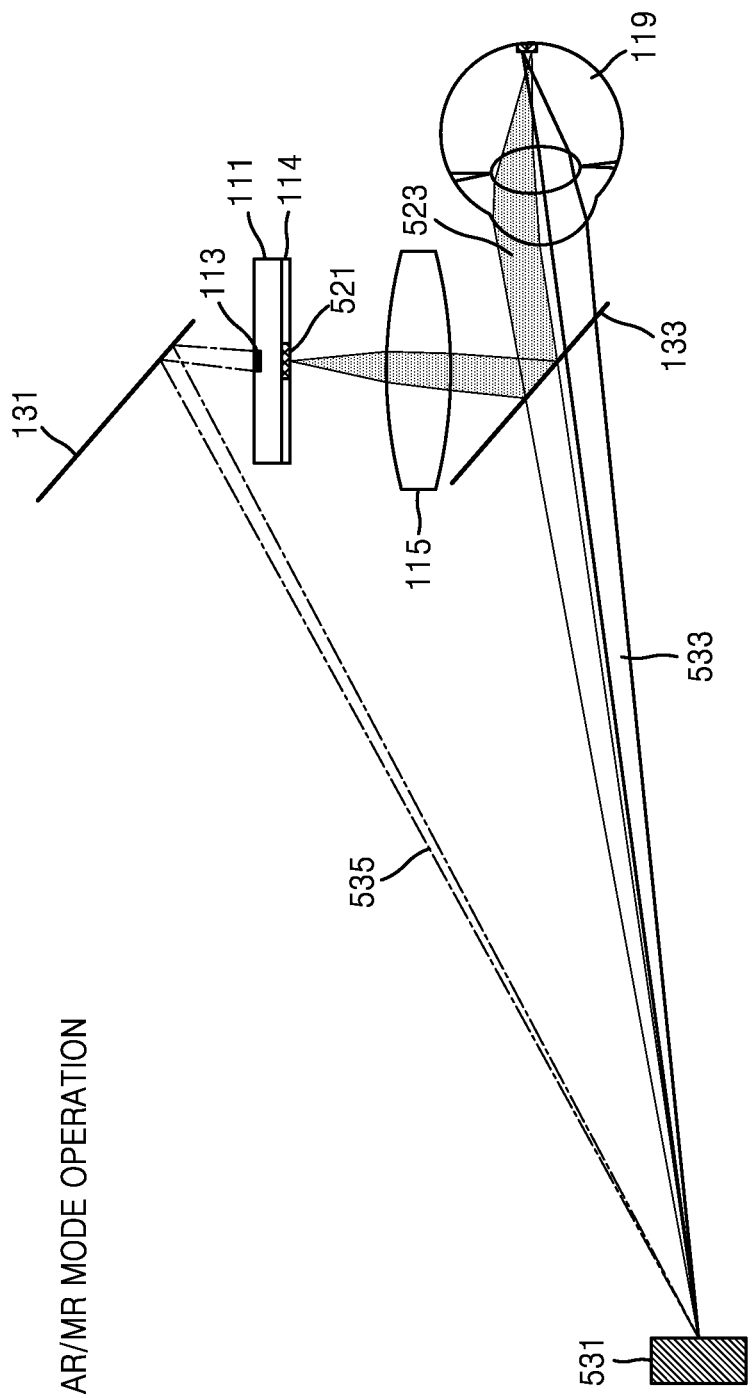
FIG. 5 illustrates a user of at least one of the AR mode (the second mode) and the MR mode (the third mode). A user may recognize AR content through the AR mode (the second mode) and MR content through the MR mode (the third mode) according to an embodiment of the disclosure.
Figure 6:
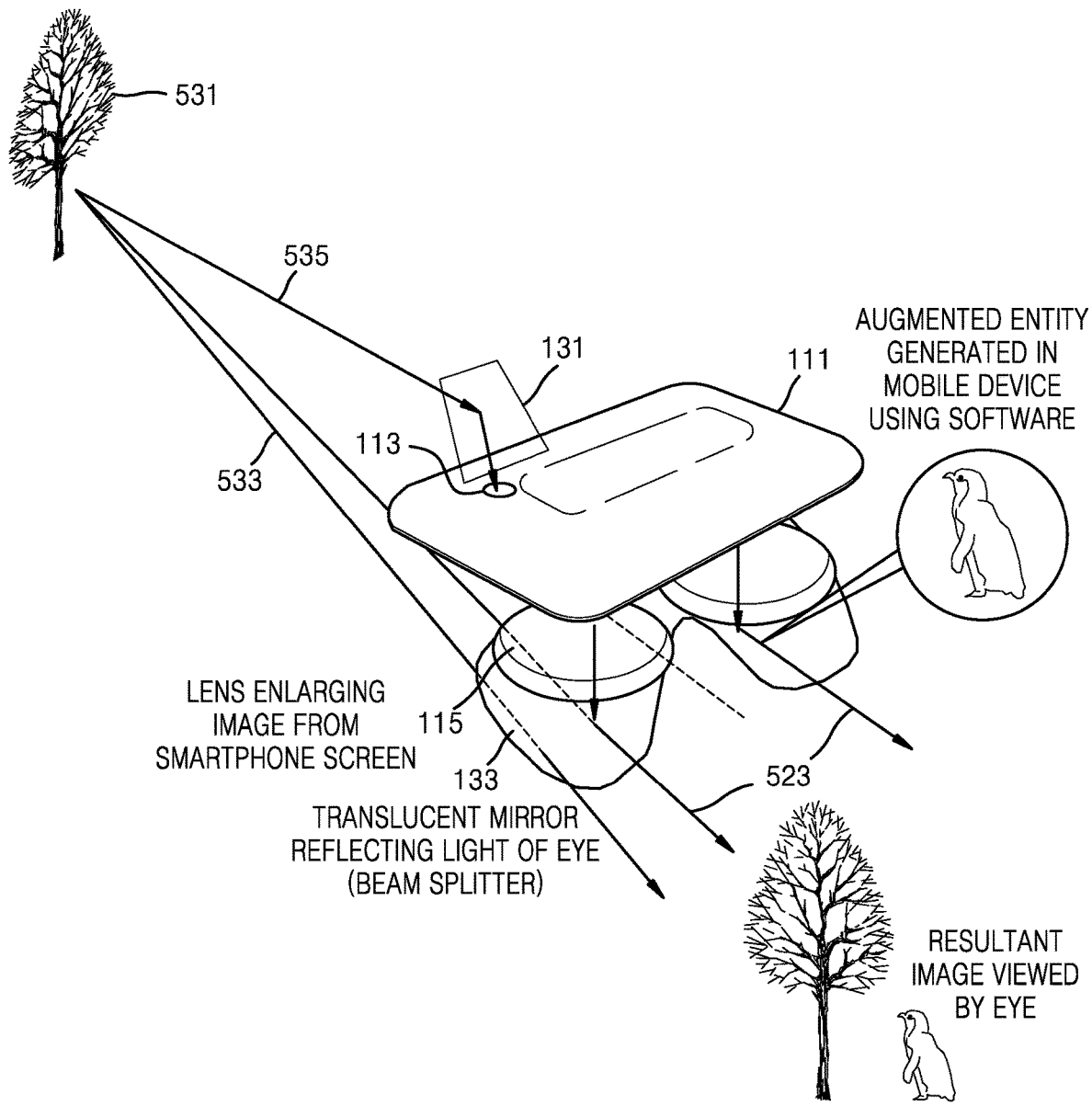
FIG. 6 shows a three-dimensional representation of the second mode described with reference to FIG. 5 according to an embodiment of the disclosure.
Figure 7:
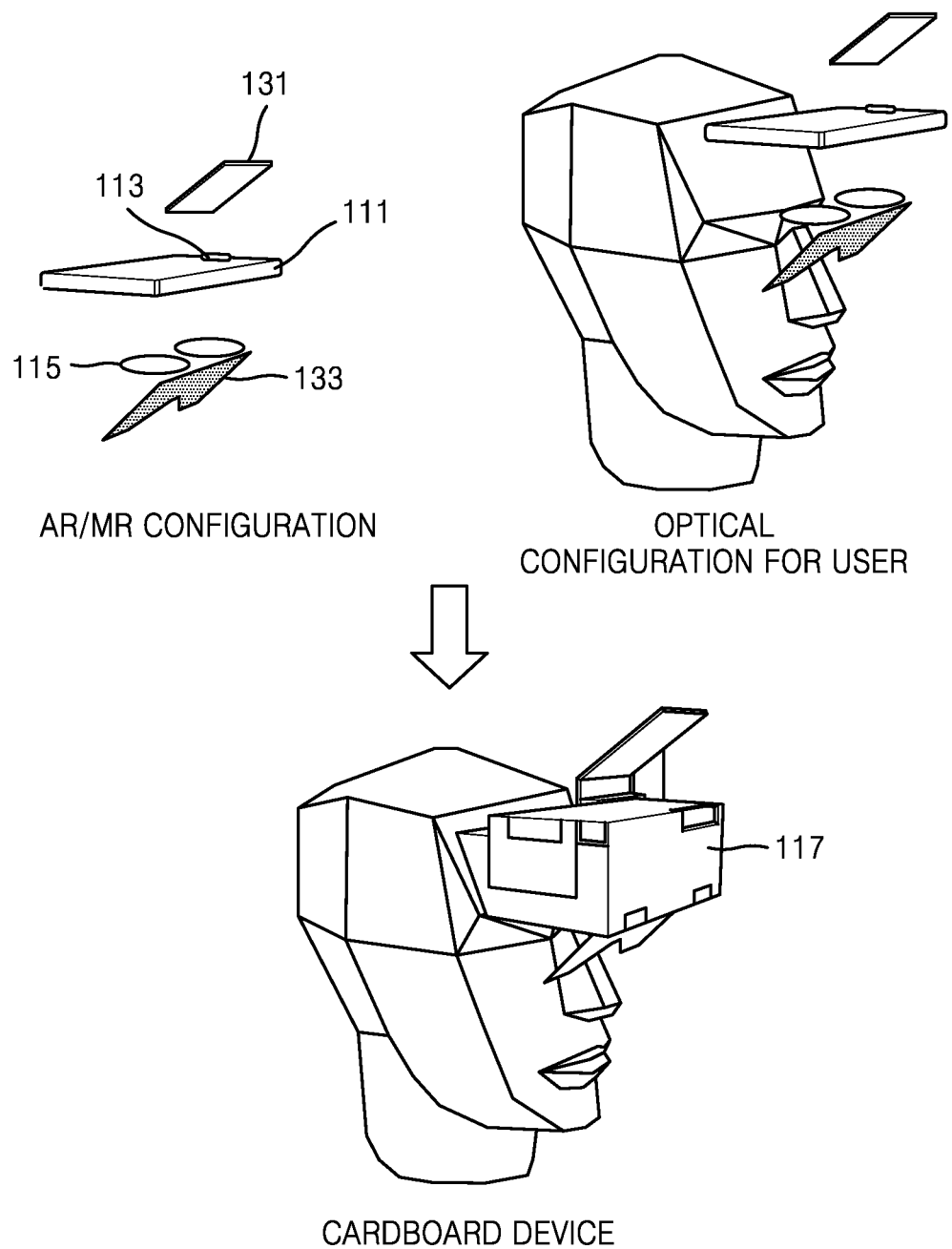
FIG. 7 illustrates a user wearing the optical device according to an embodiment of the disclosure.

FIGS. 5, 6, and 7 show devices for configuring at least one of an AR mode (a second mode) and an MR mode (a third mode) according to various embodiments of the disclosure.

FIG. 5 illustrates an embodiment of at least one of the AR mode (the second mode) and the MR mode (the third mode). A user may recognize AR content through the AR mode (the second mode) and MR content through the MR mode (the third mode) according to an embodiment of the disclosure.

Referring to FIG. 5, the second configuration units may include the terminal 111, the lens 115, the container 117, the mirror 131, and the translucent mirror 133.

In an embodiment, the terminal 111 may be a mobile smart device. The terminal 111 may include the camera 113 and the display 114.

In at least one of the AR mode (the second mode) and the MR mode (the third mode), the user's eye 119 may recognize a real signal 533 with respect to a real object 531 through the translucent mirror 133.

In the AR mode (the second mode), the user's eye 119 may recognize a signal 523 corresponding to the AR content. In the MR mode (the third mode), the user's eye 119 may recognize the signal 523 for the MR content.

The translucent mirror 133 may output the real signal 533 from the real object 531 to the user's eye 119 by having the real signal 533 transmitted therethrough. The translucent mirror 133 may reflect the signal 523 with respect to the AR content and output the signal 523 to the user's eye 119.

The mirror 131 may reflect a real signal 535 of the real object 531 and output the reflected real signal 535 to the camera 113. Accordingly, the mirror 131 may track the real world.

The mirror 131 may be coupled to one side of the container 117 at a predetermined angle. Specifically, the mirror 131 may be coupled to one side of the container 117 at an angle sufficient to track the real world. One side of the container 117 may mean a coupling position of the mirror 131 suitable for the camera 113 to receive the real signal 535.

However, the mirror 131 may be optional in the AR mode, not in the MR mode. Therefore, in the MR mode, the mirror 131 may exist at an angle to reflect the real signal 535 with respect to the real object 531. Meanwhile, in the AR mode, the mirror 131 may exist at an angle that may not reflect the real signal 535 with respect to the real object 531.

Likewise, the camera 113 may also be optional in the AR mode, not in the MR mode. Thus, in the MR mode, at least one processor may operate the camera 113. Meanwhile, in the MR mode, the at least one processor may not operate the camera 113.

In the AR mode, the at least one processor of the terminal 111 may output a signal with respect to the AR content through the display 114.

The at least one processor may control a light emitting device 521 of the display 114 to output the signal with respect to the AR content toward the lens 115.

The signal with respect to the AR content may be input to the user's eye 119 after transmitting through the lens 115 and reflected by the translucent mirror 133.

The translucent mirror 133 may output the real signal 533 of the real object 531 to the user's eyes 119 by having the real signal 533 transmitted therethrough. The translucent mirror 133 may reflect the signal 523 with respect to the AR content and output the signal 523 to the user's eye 119.

The translucent mirror 133 may be coupled to one side of the container 117 at a predetermined angle. More specifically, the translucent mirror 133 may be coupled to one side of the container 117 at an angle sufficient to output the real signal 533 of the real object 531 to the user's eye 119 by having the real signal 533 transmitted therethrough. The translucent mirror 133 may reflect the signal 523 with respect to the AR content and may be coupled to one side of the container 117 at an angle sufficient to output the signal 523 with respect to the AR content to the user's eye 119.

One side of the container 117 may be a coupling position of the translucent mirror 133 suitable for outputting the real signal 533 of the real object 531 to the user's eye 119 by having the real signal 533 transmitted therethrough and simultaneously suitable for outputting the signal 523 with respect to the AR content to the user's eye 119 by reflecting the signal 523 with respect to the AR content.

The user's eye 119 may recognize the signal 523 with respect to the AR content as a virtual signal with respect to the real object 531. Thus, the user may simultaneously recognize a virtual object combined with the real object 531.

That is, the AR mode may be a mode in which a signal with respect to the AR content output from the display 114 and a signal with respect to the real object 531 to be viewed by the user through the translucent mirror 133 are overlapped and input to the user's eye 119.

In the MR mode, the at least one processor of the terminal 111 may analyze the intensity, position, and direction of the real signal 535 recognized through the camera 113 by using software and output a signal with respect to the MR content reflecting a result of analysis through the display 114. The signal with respect to the MR content may be input to the user's eye 119 after transmitting through the lens 115 and reflected by the translucent mirror 133.

Specifically, the at least one processor may track a specific state of the real object 531 by analyzing elements such as brightness, intensity, position, and direction of the real signal 535.

The at least one processor may generate a signal with respect to the MR content suitable for the real object 531 according to the specific state of the real object 531 and output the generated signal to the display 114.

For example, when the brightness of the real object 531 is dark, the at least one processor may output the MR content in a dark brightness such that the user may recognize the real object 531 and the MR content more naturally.

The at least one processor may control the light emitting device 521 of the display 114 to output the signal with respect to MR content to the lens 115.

The lens 115 may refract the signal 523 with respect to MR content and output the signal 523 to the translucent mirror 133. As an example, the lens 115 may enlarge the signal 523 with respect to MR content and output the signal 523 to the translucent mirror 133. However, this is only one example that the lens 115 may perform. According to various embodiments, the lens 115 may output the signal 523 with respect to MR content as it is or by reducing the signal 523.

The translucent mirror 133 may reflect the signal 523 with respect to MR content and output the signal 523 with respect to MR content to the user's eye 119.

The user's eye 119 may recognize the signal 523 with respect to MR content as a virtual signal with respect to the real object 531. Thus, the user may simultaneously recognize a virtual object combined with the real object 531.

That is, the AR mode may be a mode in which a signal with respect to the real object 531 to be viewed by the user through the translucent mirror 133 and a signal with respect to the MR content output from the display 114 based on a signal with respect to the real object 531 recognized by the camera 113 through the mirror 131 are overlapped and input to the user's eye 119.

However, since a position of the camera 113 for outputting the signal 523 with respect to MR content and a position of the user's eye 119 are different from each other, an optical signal finally perceived by the user's eye 119 may be a somewhat distorted optical signal.

Accordingly, the container 117 may further include an adjuster (not shown) for adjusting a distortion phenomenon that may occur in the second mode.

The adjuster is a concept including a device for adjusting a position of the mirror 131.

For example, the user may adjust an angle formed between the mirror 131 and the terminal 111 through the adjuster (not shown). Also, the at least one processor may reduce the distortion phenomenon through calibration software. Specifically, the user may input the distortion information requested by the calibration software to the terminal 111.

The at least one processor may calibrate a distortion state of a signal with respect to the real object 531 recognized by the camera 113 based on the distortion information and output the signal 523 with respect to MR content to the display 114.

The relationship between the calibration software and related devices will be described in more detail with reference to FIG. 9.

FIG. 6 shows a three-dimensional representation of the second mode described with reference to FIG. 5 according to an embodiment of the disclosure.

Referring to FIG. 6, the second configuration units may include the terminal 111, the lens 115, the container 117, the mirror 131, and the translucent mirror 133.

The user may recognize the AR content through the AR mode (the second mode) and the MR content through the MR mode (the third mode).

The translucent mirror 133 may output the real signal 533 of the real object 531 to the user's eye 119 by having the real signal 533 transmitted therethrough. The translucent mirror 133 may be a beam splitter reflecting part of light and transmitting the other part thereof.

The mirror 131 may output the real signal 535 of the real object 531 to the camera 113 by reflecting the real signal 535. Accordingly, the mirror 131 may track the real world.

However, the mirror 131 may be optional in the AR mode, not in the MR mode. Therefore, in the MR mode, the mirror 131 may exist at an angle to reflect the real signal 535 with respect to the real object 531. Meanwhile, in the AR mode, the mirror 131 may exist at an angle that may not reflect the real signal 535 with respect to the real object 531.

Likewise, the camera 113 may also be optional in the AR mode, not in the MR mode. Thus, in the MR mode, the at least one processor may operate the camera 113. Meanwhile, in the AR mode, the at least one processor may not operate the camera 113.

In the AR mode, the at least one processor of the terminal 111 may output a signal with respect to the AR content through the display 114.

The signal with respect to the AR content may be input to the user's eye 119 after transmitting through the lens 115 and reflected by the translucent mirror 133.

The translucent mirror 133 may reflect the signal 523 with respect to the AR content and output the signal 523 with respect to the AR content to the user's eye 119.

The user's eye 119 may recognize the signal 523 with respect to the AR content as a virtual signal with respect to the real object 531. Thus, the user may simultaneously recognize a virtual object combined with the real object 531.

That is, the AR mode may be a mode in which a signal with respect to the AR content output from the display 114 and a signal with respect to the real object 531 to be viewed by the user through the translucent mirror 133 are overlapped and input to the user's eye 119.

In the MR mode, the at least one processor of the terminal 111 may analyze the intensity, position, and direction of the real signal 535 recognized through the camera 113 by using software and output a signal with respect to the MR content reflecting a result of analysis through the display 114.

Specifically, the at least one processor may track a specific state of the real object 531 by analyzing elements such as brightness, intensity, position, and direction of the real signal 535.

The at least one processor may generate a signal with respect to the MR content suitable for the real object 531 according to the specific state of the real object 531 and output the generated signal to the display 114.

For example, when the brightness of the real object 531 is dark, the at least one processor may output the MR content in a dark brightness such that the user may recognize the real object 531 and the MR content more naturally.

The lens 115 may refract the signal 523 with respect to MR content and output the signal 523 to the translucent mirror 133.

The translucent mirror 133 may reflect the signal 523 with respect to MR content and output the signal 523 with respect to MR content to the user's eye 119.

The user's eye 119 may recognize the signal 523 with respect to MR content as a virtual signal with respect to the real object 531. Thus, the user may simultaneously recognize a virtual object combined with the real object 531.

That is, the AR mode may be a mode in which a signal with respect to the real object 531 to be viewed by the user through the translucent mirror 133 and a signal with respect to the MR content output from the display 114 based on a signal with respect to the real object 531 recognized by the camera 113 through the mirror 131 are overlapped and input to the user's eye 119.

FIG. 7 illustrates a user wearing the optical device according to an embodiment of the disclosure.

Referring to FIG. 7, the second configuration units may include the terminal 111, the lens 115, the container 117, the mirror 131, and the translucent mirror 133.

In an embodiment, the terminal 111 may be a mobile smart device.

The terminal 111 may include at least one processor (not shown), the camera 113 and the display 114.

The container 117 may include a supporter for supporting the second configuration units and a switcher for switching to one of the first mode and the second mode.

The supporter may be a concept including all physical devices for supporting the second configuration units and a combination of the physical devices.

The switcher may be a concept including all physical devices for the user to switch to one of the first mode and the second mode and a combination of the physical devices.

The supporter and the switcher may be realized by an integral physical device.

For example, the container 117 may be formed as a corrugated cardboard. As shown in FIG. 7, the container 117 may be configured as an integral cardboard. The container 117 may physically support the second configuration units to fix the second configuration units at a predetermined position. The user may switch from the second mode to the first mode through the switcher included in the container 117.

Figure 8:
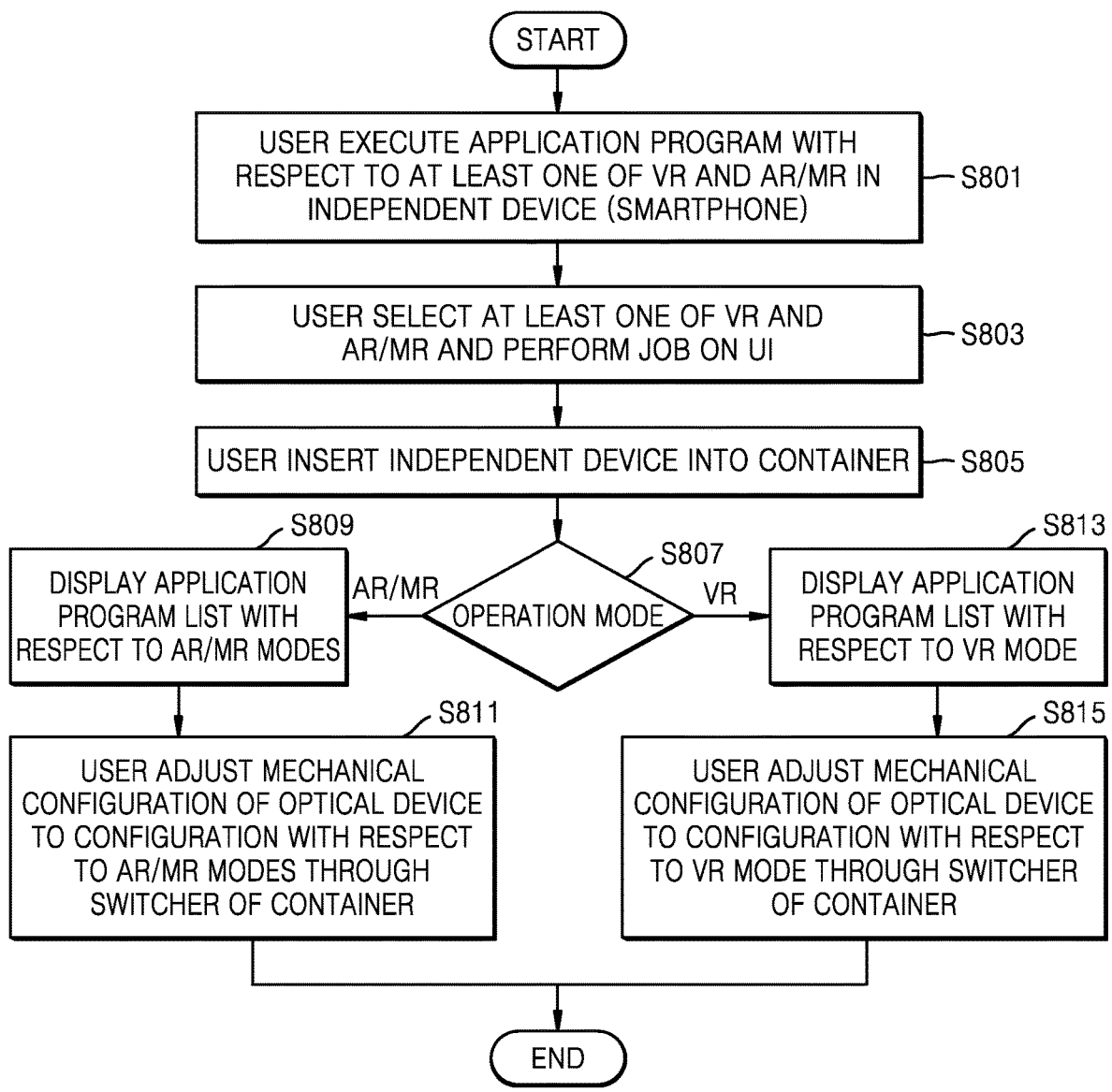
FIG. 8 shows a use order of a user with respect to an optical device according to an embodiment of the disclosure.

FIG. 8 shows a use order of a user with respect to an optical device according to an embodiment of the disclosure.

Referring to FIG. 8, in operation S801, the user may execute an application program with respect to at least one of a VR mode, an AR mode, and a MR mode through the terminal 111.

In operation S803, the user may select at least one of the VR mode, the AR mode, and the MR mode in the application program, and perform a basic job on a UI of the application program.

In operation S805, the user may insert and mount the terminal 111 into the container 117. The container 117 may be a head mount device mounted on a user's head.

In operation S807, at least one processor of the terminal 111 may confirm a mode among the VR mode, the AR mode, or the MR mode.

In the case of any one of the AR mode and the MR mode, in operation S809, the at least one processor of the terminal 111 may display an application program list with respect to any one of the AR mode and the MR mode through the display 114 to the user.

In operation S811, the user may adjust the mechanical configuration of the optical device to a configuration with respect to any one of the AR mode and the MR mode through a switcher of the container 117.

In the case of the VR mode, in operation S813, the at least one processor of the terminal 111 may display an application program list with respect to the VR mode to the user through the display 114.

In operation S815, the user may adjust the mechanical configuration of the optical device to a configuration with respect to the VR mode through the switcher of the container 117.

Figure 9:
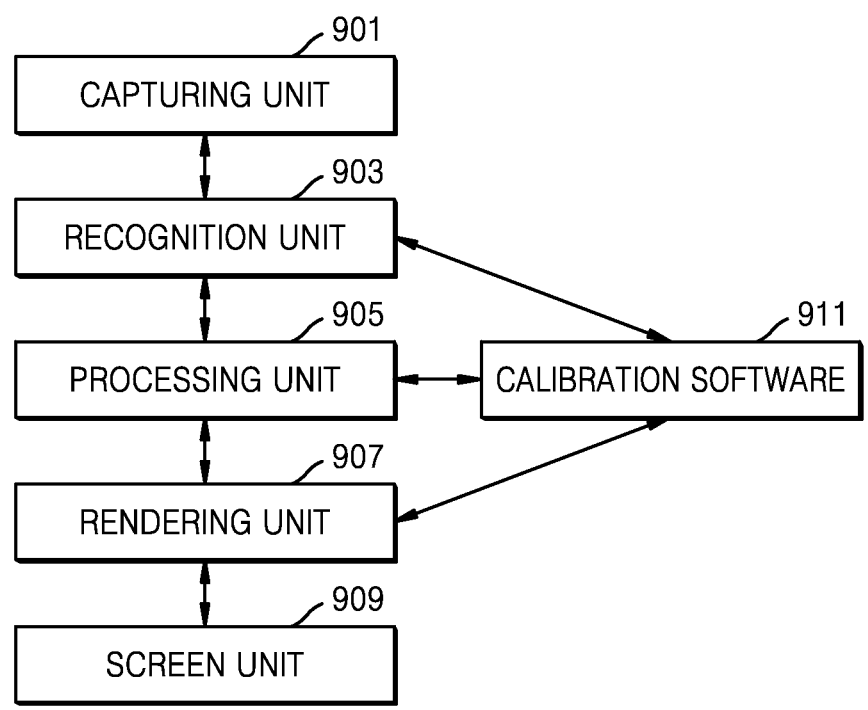
FIG. 9 illustrates a relationship between devices for reducing a distortion phenomenon through calibration software according to an embodiment of the disclosure.

FIG. 9 illustrates the relationship between devices for reducing a distortion phenomenon through calibration software according to an embodiment of the disclosure.

Referring to FIG. 9, a capturing unit 901 may receive an optical signal with respect to a real object. The capturing unit 901 may include the camera 113.

A recognition unit 903 may obtain information about the real object from the optical signal received through the capturing unit 901. The recognition unit 903 may operate by at least one processor.

A processing unit 905 may include software and associated UI/UX according to at least one of a VR mode, an AR mode, and a MR mode. The processing unit 905 may receive the information about the real object from the recognition unit 903 and transmit the information about the real object to a rendering unit 907 such that the user's eye 119 may recognize the information. The processing unit 905 may operate by the at least one processor.

The rendering unit 907 may generate an optical signal recognizable by the user's eye 119. The rendering unit 907 may output the optical signal recognizable by the user's eye 119 through a screen unit 909. The rendering unit 907 may operate by the at least one processor.

The screen unit 909 may output the optical signal recognizable by the user's eye 119. The screen unit 909 may be the display 114.

Since a position of the camera 113 for outputting the signal 523 with respect to MR content and a position of the user's eye 119 are different from each other in the MR mode, the optical signal finally recognized by the user's eye 119 may be a somewhat distorted optical signal.

The at least one processor may reduce the distortion phenomenon through calibration software 911.

In an embodiment, the at least one processor may compare information about the real object obtained through the recognition unit 903 and the optical signal recognizable by the user's eye through the rendering unit 907, through the calibration software 911. The at least one processor may input a result of comparison to the processing unit 905 through the calibration software 911 to generate the signal from which distortion is reduced.

In another embodiment, the user may directly input distortion information required by the calibration software 911 to the terminal 111. The at least one processor may calibrate a distortion state of a signal with respect to the real object recognized by the camera 113 based on the distortion information and output the signal 523 with respect to MR content through the display 114.

According to embodiments of the disclosure, a VR mode, an AR mode, and a MR mode may be implemented by one optical device.

According to embodiments of the disclosure, when implementing the VR mode, the AR mode, and the MR mode, by utilizing devices that may be commonly used in each mode, the cost of configuring the optical device according to the disclosure may be reduced.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

Those of ordinary skill in the art would understand the block diagrams disclosed in the disclosure as conceptual diagrams of circuits for realizing the principles of the disclosure. Similarly, it would be apparent to those of ordinary skill in the art that arbitrary flow charts, flow diagrams, state transition diagrams, pseudo code, and the like denote various processes that may be substantially stored in a computer-readable recording medium and that may be performed by a computer or a processor, regardless of whether the computer or the processor are explicitly illustrated or not. Thus, the embodiments of the disclosure described above may be embodied as a computer program. The computer program may be stored in a computer-readable recording medium, and executed using a general digital computer. Examples of the computer-readable medium are a magnetic recording medium (a ROM, a floppy disc, a hard disc, etc.), and an optical recording medium (a CD-ROM, a DVD, etc.).

The functions of various elements illustrated in the drawings may be related to appropriate software, and be provided via not only hardware capable of executing the software but also exclusive hardware. These functions may also be provided via a single exclusive processor, a single shared processor, or a plurality of individual processors, some of which may be shared. Also, explicit use of the term 'processor' or 'controller' is not limited to exclusively using hardware capable of executing software, and may implicitly include hardware such as a digital signal processor (DSP), and a read-only memory (ROM), a random access memory (RAM), or a non-volatile storage medium for storing software.

In the claims of the specification, an element suggested as an element for performing a specific operation includes any arbitrary methods of performing the specific operation. Examples of this element may include a combination of circuit elements capable of performing the specific operation, or software having an arbitrary form, e.g., firmware or microcode, which is combined with an appropriate circuit for executing software for performing the specific operation.

In the disclosure, the expression 'an embodiment' of the principles of the disclosure and various modifications of this expression mean that specific features, structure, and characteristics related to this embodiment are included in at least one embodiment of the principles of the disclosure. Thus, the expression 'an embodiment' and arbitrary other modifications thereof disclosed in the disclosure do not always indicate the same embodiment.

In the disclosure, the expression 'at least one of' of 'at least one of A and B' is used to inclusively mean that only the first option (A) is selected, only the second option (B) is selected, or both the first and second operations (A and B) are selected. In addition, the expression 'at least one of A, B, and C' is used to inclusively mean that only the first option (A) is selected, only the second option (B) is selected, only the third option (C) is selected, only the first and second options (A and B) are selected, only the second and third options (B and C) are selected, only the first and third (A and C) are selected or all the three options (A, B, and C) are selected. When more than three items are listed in relation to this expression, the meaning thereof would be apparent to those of ordinary skill in the art.

Various embodiments of the disclosure have been described above.

While the disclosure has been particularly shown and described with reference to various embodiments thereof, it will be understood by those of ordinary skilled in the art that various changes in form and details may be made therein without departing from the spirit and scope of the disclosure as defined by the appended claims and their equivalents. The various embodiments should be considered in a descriptive sense only and not for purposes of limitation. Therefore, the scope of the disclosure is defined not by the detailed description of the disclosure but by the appended claims, and all differences within the scope will be construed as being included in the disclosure.

What is claimed is:

1. An optical device comprising:
    a terminal comprising:
        a camera,
        a display,
        at least one memory configured to store program instructions, and
        at least one processor;
    a container comprising a lens configured to receive a signal transmitted from the display;
    a first mirror coupled to a first side of the container at a first predetermined angle; and
    a second mirror coupled to a second side of the container at a second predetermined angle,
    wherein the program instructions, when executed by the at least one processor, cause the at least one processor to:
        perform a first mode operation of controlling the display to allow a user to recognize virtual reality (VR) content via the lens,
        perform a second mode operation of controlling the display to allow the user to recognize augmented reality (AR) content via the lens and the first mirror, and
    perform a third mode operation of controlling the display and the camera to allow the user to recognize mixed reality (MR) content via the lens, the first mirror, and the second mirror,
    wherein the third mode comprises a mode in which an object signal and an MR signal are overlapped and input to eyes of the user, and
    wherein the object signal is related to an object viewed by the user through the first mirror, and the MR signal is related to the MR content output from the display based on a camera signal with respect to the object recognized by the camera through the second mirror.

2. The optical device of claim 1, wherein the first mode comprises a mode in which a VR signal with respect to the VR content output from the display is input to eyes of the user by having the signal transmitted through the lens.

3. The optical device of claim 1, wherein the second mode comprises a mode in which an AR signal with respect to the AR content output from the display and an object signal with respect to an object viewed by the user through the first mirror are overlapped and input to eyes of the user.

4. The optical device of claim 3, wherein the AR signal with respect to the AR content is input to the eyes of the user via the lens.

5. The optical device of claim 1, wherein the MR signal with respect to the MR content is input to the eyes of the user through the lens.

6. The device of claim 1, wherein the program instructions further cause the at least one processor to:
    compare the camera signal with respect to the object recognized by the camera with the object signal with respect to the object viewed by the user through the first mirror, and
    calibrate a distortion state of the camera signal with respect to the object recognized by the camera.

7. The optical device of claim 1, wherein the container further comprises a switcher configured to switch to at least one of the first mode, the second mode, or the third mode.

8. A method of operating an optical device, the method comprising:
    selecting at least one of a first mode for recognizing virtual reality (VR) content, a second mode for recognizing augmented reality (AR) content, or a third mode for recognizing mixed reality (MR) content; and
    based on a result of the selecting, performing at least one of:
        the first mode by controlling a display to allow a user to recognize the VR content via a lens,
        the second mode by controlling the display to allow the user to recognize the AR content via the lens and a first mirror, or
        the third mode by controlling the display and a camera to allow the user to recognize the MR content via the lens, the first mirror, and a second mirror,
    wherein the third mode comprises a mode in which an object signal and an MR signal are overlapped and input to eyes of the user, and
    wherein the object signal is related to an object viewed by the user through the first mirror, and the MR signal is related to the MR content output from the display based on a camera signal with respect to the object recognized by the camera through the second mirror.

9. The method of claim 8, wherein the first mode comprises a mode in which a signal with respect to the VR content output from the display is input to eyes of the user via the lens.

10. The method of claim 8, wherein the second mode comprises a mode in which an AR signal with respect to the AR content output from the display and an object signal with respect to an object viewed by the user through the first mirror are overlapped and input to eyes of the user.

11. The method of claim 10, wherein the AR signal with respect to the AR content is input to the eyes of the user via the lens.

12. The method of claim 8, wherein the first mirror is coupled to a first side of a container at a first predetermined angle.

13. The method of claim 12, wherein the second mirror is coupled to a second side of the container at a second predetermined angle.

14. The method of claim 8, wherein the MR signal with respect to the MR content is input to the eyes of the user via the lens.

15. The method of claim 8, wherein the third mode comprises a mode in which the camera signal with respect to the object recognized by the camera and the object signal with respect to the object viewed by the user through the first mirror are compared to calibrate a distortion state of the camera signal with respect to the object recognized by the camera.

16. A computer program product comprising a non-transitory computer readable recording medium comprising a program to perform operations of:
- selecting at least one of a first mode for recognizing virtual reality (VR) content, a second mode for recognizing augmented reality (AR) content, or a third mode for recognizing mixed reality (MR) content; and
- based on a result of the selecting, performing at least one of:
  - the first mode by controlling a display to allow a user to recognize the VR content via a lens,
  - the second mode by controlling the display to allow the user to recognize the AR content via the lens and a first mirror, or
  - the third mode by controlling the display and a camera to allow the user to recognize the MR content via the lens, the first mirror, and a second mirror,
- wherein the third mode comprises a mode in which an object signal and an MR signal are overlapped and input to eyes of the user, and
- wherein the object signal is related to an object viewed by the user through the first mirror, and the MR signal is related to the MR content output from the display based on a camera signal with respect to the object recognized by the camera through the second mirror.

* * * * *